United States Patent Office 3,272,795
Patented Sept. 13, 1966

3,272,795
GLUCAMINE SALTS OF BENZONITRILES
Basil Jason Heywood, Hornchurch, William George Leeds, London, and Raymond Frederick Collins, Harold Wood, England, assignors to May & Baker Limited, Dagenham, England
No Drawing. Filed May 24, 1965, Ser. No. 458,414
Claims priority, application Great Britain, May 26, 1964, 21,781/64
3 Claims. (Cl. 260—211)

This invention relates to new benzonitrile compounds which are useful as herbicides.

It is known that 4-hydroxybenzonitrile derivatives of the general formula:

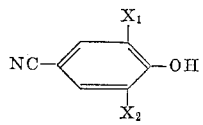

wherein $X_1$ and $X_2$ are the same or different and each represents a bromine or iodine atom, and certain salts thereof, possess valuable herbicidal properties, particularly in the selective control of broad-leafed annual weeds in graminaceous crops. It is highly desirable in the practice of selective weed control by the application of chemical compounds to prepare herbicidal compositions in the form of simple aqueous concentrates which can be diluted with water to give compositions which are ready for use. Such concentrates should generally contain at least 25% w./v. (weight by volume) of the active ingredient, and preferably at least 40% w./v. However, the preparation of aqueous concentrates containing the compounds of Formula I and previously described salts such as the alkali metal, alkaline earth metal and ammonium salts, and amine salts such as the mono-, di- and tri-alkylamine and mono-, di- and tri-hydroxyalkylamine (e.g. ethanolamine) salts, has given rise to difficulties because they are, in general, less than 20% (in terms of the phenol) w./v. soluble in water at 20–25° C. The triethanolamine salt of 3,5-dibromo-4-hydroxybenzonitrile (i.e. the compound of Formula I in which $X_1$ and $X_2$ represent bromine atoms) is exceptional in that a 40% w./v. aqueous solution can be obtained at 20–25° C. but this solution solidifies rapidly when cooled to 0° C. while an aqueous solution containing as little as 10% w./v. solidifies at −10° C., which renders this salt generally unsuitable for use in the preparation of aqueous herbicidal concentrates. Further difficulties are encountered when, as is frequently the case, it is desired to incorporate into the aqueous concentrates other selective herbicides, for example the known phenoxy-alkanoic acid herbicides. The problem is particularly acute with the preparation of aqueous concentrates containing, as active ingredients, a compound of Formula I and one of the widely-used phenoxyalkanoic acid selective herbicides 2,4-D (2,4-dichlorophenoxyacetic acid), 2,4,5-T (2,4,5-trichlorophenoxyacetic acid) and 2,4,5-TP [α-(2,4,5-trichlorophenoxy)propionic acid].

As a result of research and experimentation, it has unexpectedly been found that certain new amine salts of the hydroxybenzonitrile derivatives of Formula I possess particularly advantageous properties in the preparation of aqueous herbicidal concentrates.

The new amine salts of the aforesaid hydroxybenzonitriles which, as new compounds, form a feature of the present invention are glucamine salts of the general formula:

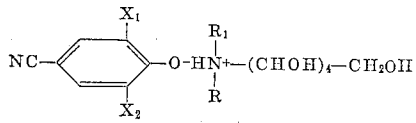

wherein $X_1$ and $X_2$ are as hereinbefore defined, and $R_1$ and $R_2$ are the same or different and each represents a hydrogen atom or a methyl, ethyl, 2-hydroxyethyl or 2-hydroxypropyl group. Of particular importance in the preparation of aqueous herbicidal compositions are the salts of Formula II wherein $X_1$ and $X_2$ are identical, $R_1$ is a methyl group and $R_2$ is a hydrogen atom.

The glucamine salts of Formula II are extremely soluble in water and their high water-solubility renders the preparation of aqueous concentrates containing 40% w./v. or more of herbicidally active ingredient a simple matter. Such aqueous concentrates and herbicidal compositions obtained by their dilution with water form further features of the present invention.

The glucamine salts of Formula II possess herbicidal properties similar to those of the known compounds of Formula I and their salts heretofore disclosed and, hence, according to another aspect of the present invention, there is provided a method for the post-emergent control of broad-leafed weeds growing in an arable tract of land, which contains, or will contain, a useful crop as hereinafter specified, which comprises spraying the aerial or exposed parts of the weeds with a herbicidal composition obtained by the dilution with water of an aqueous concentrate containing one or more of the glucamine salts of Formula II. By "weeds" is meant undesired vegetation.

The glucamine salts of Formula II can be used to control the growth of one or more broad-leafed weeds such as *Ambrosia artemisiifolia*, Amthemis spp., *Amaranthus retroflexus*, *Atriplex patula*, *Barbarea vulgaris*, *Brassica alba*, *Brassica nigra*, *Capsella bursa-pastoris*, *Chenopodium album*, *Chrysanthemum segetum*, *Datura stramonium*, *Erysimum cheiranthoides*, *Galium aparine*, Galeopsis spp., Lychnis spp., *Matricaria chamomilla*, *Matricaria inodora*, *Portulaco oleraceae*, *Polygonum aviculare*, *Polygonum convolvulus*, *Polygonum lapathifolium*, *Polygonum persicaria*, *Polygonum hydropiper*, *Polygonum scabrum*, *Raphanus raphanistrum*, *Spergula arvensis*, *Stellaria media*, *Sonchus* species, *Senecie vulgaris*, *Sinapis arvensis*, *Veronica* species and *Xanthium* species.

The amounts of glucamine salt or salts applied to the weeds to control their growth vary with the nature of the weeds, the compositions applied, the mode and time of application, and when the growth of weeds is to be controlled in the presence of crops, the nature of the crops. In general, taking these factors into account, application rates of 4 to 16 ozs. per acre (in terms of the phenol) give good results, particularly with the preferred compounds. It must, however, be understood that higher application rates may be used to secure more complete control, particularly of resistant weed species, to the extent that this is consistent with the tolerance of any crops present.

The glucamine salts of Formula II are particularly suitable for application to crop-growing areas. By the term "crop-growing areas" is meant areas on which crops are, or will be, growing. The glucamine salts should be applied at a rate such that the crops do not suffer any substantial permanent damage.

Crops found to be particularly suitable for treatment include graminaceous croups such as grasses, for example Poa species, Festuca species, Dactylis species, Lolium species and Agrostis species, sugarcane and cereals, for example wheat, oats, barley, rye, maize, rice, millet and sorghum; legumes such as peas, beans, lucerne (alfalfa) and red and white clovers; flax, linseed, carrots, onions, and cruciferous crops such as kale, rape and cabbage. The amounts of the glucamine salt or salts of Formula II applied in the aforesaid treatments vary with the nature of the crop and the mode and time of application. In general, taking these factors into account, it is found that, particularly when using the preferred compounds, crops and crop-growing areas may be treated at rates of up to 8 ozs. (in terms of the phenol) of the glucamine salts of Formula II per acre without risk of substantial permanent damage to the crop, while graminaceous crops in particular may with safety be treated at rates of up to 24 ozs. (in terms of the phenol), per acre.

Areas of fallow or uncultivated land can also be treated with one or more of the glucamine salts of Formula II to control the growth of undesired vegetation. When used for this purpose, in which a total herbicidal effect is frequently desired, the compositions are normally applied at dosage rates higher than that those used in the treatment of crop-growing areas in which crops are growing and in the treatment of weeds to control their growth in the presence of crops. The precise dosage rate utilised will depend upon the nature of the vegetation treated and the effect sought, but in general dosage rates of 2 to 4 lbs. (in terms of the phenol) per acre give good results.

In a similar manner to the treatment of fallow or uncultivated land, undesired vegetation growing in crop-growing areas such as plantations, orchards and vineyards may be treated to control its growth by directional application, particularly by directional spraying.

Compositions containing the glucamine salts of Formula II can also be used to exercise a desiccant effect on crops such as potatoes, hops and leguminous seed-crops. For these purposes, application rates of 1 to 4 lbs. (in terms of the phenol) give good results.

The herbicidal compositions of the present invention may contain a surface active agent. The surface active-agent may be of the ionic or non-ionic type, for example, sulphoricinoleates; quaternary ammonium derivatives; products based on condensates of ethylene oxide, such as condensates of ethylene oxide with nonyl or octyl phenol; fatty acid esters of anhydrosorbitols which have been rendered soluble by etherification of the free hydroxy groups by condensation with ethylene oxide; alkali and alkaline earth metal salts of sulphuric acid esters and sulphonic acids such as sodium di-nonyl and di-octyl sulphosuccinates; and alkali and alkaline earth metal salts of high molecular weight sulphonic acid derivatives such as sodium and calcium lignosulphonates.

Herbicidal compositions according to the present invention may also contain, if desired, conventional adjuvants such as adhesives.

The present invention includes also the preparation of aqueous herbicidal concentrates which comprises dissolving one or more glucamine salts of Formula I in water or by preparing the glucamine salts of Formula II, by processes hereinafter described, in water as the reaction medium to give aqueous concentrates directly.

The present invention further includes the preparation of the new glucamine salts of Formula II, from the corresponding known benzonitrile derivatives of Formula I or salts thereof, for example:

(a) By reaction with a glucamine of formula:

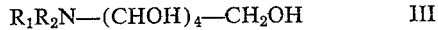

$$R_1R_2N-(CHOH)_4-CH_2OH \qquad III$$

wherein $R_1$ and $R_2$ are as hereinbefore defined. The reaction is conveniently effected by dissolving the solid phenol of Formula I in a concentrated aqueous solution of the glucamine of Formula III, (b) By a double decomposition reaction of a soluble salt of a hydroxybenzonitrile of Formula I, such as the sodium salt, with a suitable salt of a glucamine of Formula III, such as a hydrochloride, hydrobromide or sulphate. The reaction is conveniently effected by adding a solution of the aforesaid glucamine salt in a solvent such as an alcohol, e.g. ethanol, to a hot solution of the soluble hydroxybenzonitrile salt, e.g. the sodium salt, in the same solvent i.e. an alcohol, for example ethanol, and, if desired, heating the mixture under reflux to complete the reaction. The required glucamine salt of Formula II may then be conveniently isolated by filtering the mixture to remove the insoluble inorganic salt, e.g. sodium chloride, and evaporating the solvent, e.g. ethanol, to dryness, (c) Wherein one or both of $R_1$ and $R_2$ represent a 2-hydroxyethyl or 2-hydroxypropyl group, by reaction of a hydroxybenzonitrile glucamine salt of Formula II, in which $R_1$ represents a hydrogen atom and $R_2$ represents a hydrogen atom or a methyl, ethyl, 2-hydroxyethyl or 2-hydroxypropyl group, with either ethylene oxide or propylene oxide. The reaction is conveniently effected in a solvent such as an alcohol, e.g. ethanol, or water.

The use of water as a solvent is particularly convenient as a concentrate of the desired glucamine salt of Formula II, in which one or both of $R_1$ and $R_2$ represents a 2-hydroxyethyl or 2-hydroxypropyl group, can be directly prepared and ready for dilution as a herbicide without the need for isolating the solid salt.

The preparation of certain of the glucamine salts of Formula II is illustrated by the following two examples.

*Example I*

3,5-diiodo-4-hydroxybenzonitrile (40 g.) was shaken with N-methylglucamine (23.2 g.; 1.1 molecular proportions) and water to give 100 ml. of solution which was filtered. The resulting clear amber solution containing 40% (acid equivalent) w./v. aqueous solution of the N-methylglucamine salt of 3,5-diiodo-4-hydroxybenzonitrile, has pH 8 and gave a clear bright solution on one hundredfold dilution with distilled water. On short term storage at 0° C., it gelled without separation of solid.

*Example II*

Proceeding as described in Example I, 3,5-dibromo-4-hydroxy-benzonitrile (40 g.) was reacted with N-methylglucamine (23.2 g.) to give a 40% (acid equivalent) w./v. aqueous solution of the N-methylglucamine salt of 3,5-dibromo-4-hydroxybenzonitrile. This clear, amber solution gave a clear bright solution on one hundredfold dilution with distilled water and remained clear on short term storage at 0° C.

As indicated above, other herbicidally active compounds may be included in the herbicidal compositions of the present invention, in particular salts of known phenoxyalkanoic acids with glucamines of Formula III and such compositions form a further feature of the present invention. Preferably, the compositions take the form of aqueous concentrates containing at least 25% (total acid equivalent) w./v., and more particularly from 40% to 50% (total acid equivalent) w./v., of herbicidally active ingredients. Particularly preferred compositions are aqueous concentrates which contain, as a first herbicidally active component, a glucamine salt of Formula II together with, as a second herbicidally active component, a salt of 2,4-D, 2,4,5-T or 2,4,5-TP with a glucamine of Formula III, and more especially a salt of 2,4-D, 2,4,5-T or 2,4,5-TP with a glucamine of Formula III in which $R_1$ is a methyl group or a 2-hydroxyethyl or 2-hydroxypropyl group and $R_2$ represents a hydrogen atom or a 2-hydroxyethyl or 2-hydroxypropyl group.

According to another aspect of the invention, there is provided a method for the post-emergent control of annual and perennial broad-leafed weeds growing in an arable tract of land, which contains, or will contain, a useful crop as hereinbefore specified, which comprises spraying aerial or exposed parts of the weeds with a herbicidal composition obtained by the dilution with water of an aqueous concentrate containing as a first component a glucamine salt of Formula II together with, as a second component, a salt of a known phenoxyalkanoic acid selective herbicide with a glucamine of Formula III, and more particularly a preferred aqueous concentrate of the present invention, the composition being in the form of a substantially homogeneous mixture of the said two components in water, the concentration and conditions of application being preferably such that the first component is applied at a dosage rate of 4 to 16 ozs. (in terms of the phenol) per acre and the second component at the rate of 4 to 24 ozs. (in terms of the free acid) per acre.

The aforesaid first component of the herbicidal composition provides, to a degree which is surprising, especially because of the extremely low application rate employed, a much wider spectrum of activity against annual broad-leafed weeds, than is characteristic of the second component when applied at the same or indeed a higher application rate together with some reduction in the aerial shoots of perennial weeds, while the second component controls perennial broad-leafed weeds such as coltsfoot (*Tussilago farfara*), creeping thistle (*Cirsium arvense*), perennial sowthistle (*Sonchus arvensis*), field bindweed (*Convolvulus arvensis*) and docks (Rumex spp.) (which are relatively resistant to the first component) as well as annual weeds normally susceptible to it.

The relative proportions of the stated components of the herbicidal compositions are preferably such as to provide a rate of application of the first component within the range already stipulated and a rate of application of the hormonal second component which is sufficient, in the presence of the first component selectively to control those weeds which are particularly susceptible to it. Preferably, the relative proportions of the first and second components (calculated as phenol and as acid, respectively) are in the range of 3:2 to 1:4.

The preferred second component is a salt of 2,4-D with a glucamine of Formula III in which $R_1$ is a methyl group or a 2-hydroxyethyl or 2-hydroxypropyl group and $R_2$ represents a hydrogen atom or a 2-hydroxyethyl or 2-hydroxypropyl group, particularly the N-methylglucamine salt of 2,4-D.

The preparation of typical compositions containing mixtures of two herbicidal components is described in the following examples.

*Example III*

A mixture of 2,4-dichlorophenoxyacetic acid (1.5 g.) and 3,5-diiodo-4-hydroxybenzonitrile (1.0 g.) was treated with N-methylglucamine (1.95 g., 5% excess) and sufficient water to give 5 ml. of solution. This gave a 50% (total acid equivalent) w./v. solution of a mixture of the N-methylglucamine salts of 2,4-dichlorophenoxyacetic acid (2,4-D) and 3,5-diiodo-4-hydroxybenzonitrile (weight ratio of herbicides is 3:2 respectively) as an aqueous concentrate in the form of a pale yellow syrup which gave a clear bright solution on one hundredfold dilution with distilled water or hard water ($CaCO_3$ equivalent 2000 p.p.m.). No solid was obtained from this solution after storage for four days at $-10°$ C.

A similar solution was prepared in which the total herbicidal active ingredient (acid equivalent) concentration was 50% w./v. but in which the ratio of 2,4-dichlorophenoxyacetic acid to 3,5-diiodo-4-hydroxybenzonitrile by weight was 2:3 (instead of 3:2). It has identical physical properties to the first solution described above.

*Example IV*

A mixture of 2,4-dichlorophenoxyacetic acid (6.0 g.) and 3,5-dibromo-4-hydroxybenzonitrile (4.0 g.) was treated with N-methylglucamine (8.5 g., 5% excess) and sufficient water to give 20 ml. of solution. This gave a 50% (total acid equivalent) w./v. solution of a mixture of the N-methylglucamine salts of 2,4-dichlorophenoxyacetic acid and 3,5-dibromo-4-hydroxybenzonitrile (weight ratio of herbicides is 3:2 respectively) as an aqueous concentrate in the form of a pale yellow syrup which gave a clear bright solution on one hundredfold dilution with distilled water or hard water ($CaCO_3$ equivalent 2000 p.p.m.). The aqueous concentrate rapidly solidified on storage at $-10°$ C. but reverted to a syrup on storage at $0°$ C.

A similar aqueous concentrate solution was prepared in which the total herbicide active ingredient (acid equivalent) concentration was 50% w./v. but in which the ratio of 2,4-dichlorophenoxyacetic acid to 3,5-dibromo-4-hydroxybenzonitrile by weight was 2:3 (instead of 3:2). It had identical physical properties to the aqueous concentrate described above in this example.

We claim:
1. Glucamine salts of the formula:

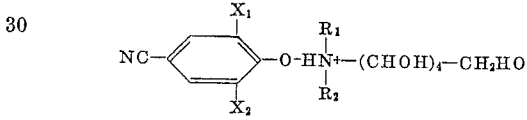

wherein $X_1$ and $X_2$ represent a member of the class consisting of bromine and iodine atoms, and $R_1$ and $R_2$ represent a member of the class consisting of hydrogen, methyl, ethyl, 2-hydroxyethyl and 2-hydroxypropyl.

2. N-methylglucamine salt of 3,5-dibromo-4-hydroxybenzonitrile.

3. N-methylglucamine salt of 3,5-diiodo-4-hydroxybenzonitrile.

References Cited by the Examiner

UNITED STATES PATENTS

| | | | |
|---|---|---|---|
| 2,181,929 | 12/1939 | Werntz | 260—211 |
| 2,193,433 | 3/1940 | Salzberg | 260—211 |
| 3,063,822 | 11/1962 | Soper | 71—2.3 |
| 3,070,431 | 12/1962 | Miller | 71—2.3 |

ELBERT L. ROBERTS, *Acting Primary Examiner.*

JAMES O. THOMAS, ALBERT J. ADAMCIK, JOHNNIE R. BROWN, *Assistant Examiners.*